May 2, 1950     C. V. EVERETT     2,506,016
GATHERING REEL FOR HARVESTERS

Filed Sept. 20, 1946     3 Sheets-Sheet 1

INVENTOR.
CHARLES VERN EVERETT
BY *A. Skrob*
ATTORNEY

May 2, 1950 C. V. EVERETT 2,506,016
GATHERING REEL FOR HARVESTERS
Filed Sept. 20, 1946 3 Sheets-Sheet 2

INVENTOR.
CHARLES VERN EVERETT
BY
ATTORNEY

May 2, 1950  C. V. EVERETT  2,506,016
GATHERING REEL FOR HARVESTERS

Filed Sept. 20, 1946  3 Sheets-Sheet 3

INVENTOR.
CHARLES VERN EVERETT
BY
ATTORNEY

Patented May 2, 1950

2,506,016

UNITED STATES PATENT OFFICE 2,506,016

GATHERING REEL FOR HARVESTERS

Charles Vern Everett, Racine, Wis., assignor to The Massey-Harris Company, Racine, Wis., a corporation of Maryland Application September 20, 1946, Serial No. 698,150

2 Claims. (Cl. 56—220)

The present invention relates to gathering reels for use on harvesters, particularly on grain combines where it is desired to have the cutter bar considerably wider than the width of the elevator. For example, as illustrated in Patent No. Re. 21,421, April 9, 1940, J. S. Troyer. In this Troyer patent, the gathering guards 44 at their front ends (see Figure 2) are equal to the overhanging ends of the cutter bar; thus they act as gathering means for moving the extra width of grain cut on the elevator.

In the present invention means are provided on the reel for assisting the gathering guards in moving the extra width of grain cut toward and on the elevator.

In harvesting wheat, for example, it has been found that a cylinder very much shorter than the length of the cutter bar can thresh the grain efficiently. Therefore by the use of my invention at a very low extra cost, the cylinder and elevator may be much shorter than the length of the cutter bar.

With the use of my invention the extra width of grain cut is moved inwardly toward the elevator, even before it contacts the gathering means, the natural result being that the heads are moved over the elevator and mixed with the mass of grain being elevated so the lower portions of the stalks, will be positively moved toward and on the elevator.

An advantage of my invention is that it may be used in conjunction with the aforementioned Troyer design or it may be used in conjunction with any other gathering means.

To these and other useful ends, my invention consists of parts, combinations of parts or their equivalents and mode of operation as hereinafter described and claimed and shown in the accompanying drawings in which:

Fig. 1 is a top view illustrating my invention as used on a combine platform wherein the cutter bar is considerably longer than the width of the elevator and length of the cylinder, the upper portion of the reel being omitted to more clearly show the position of the gathering means on the reel in relation to the gathering guards on the platform. The dividers and gathering guards are arranged for an eight foot cutter bar and a five foot elevator and cylinder.

Figs. 4, 5 and 6 are drawings illustrating modified forms of reel gathering means and bats.

The present invention is particularly adapted for use with platforms as illustrated in the aforesaid Troyer patent. It will be understood however that my improved gathering reel may be used with other forms of dividers and their gathering guards.

Figure 1:
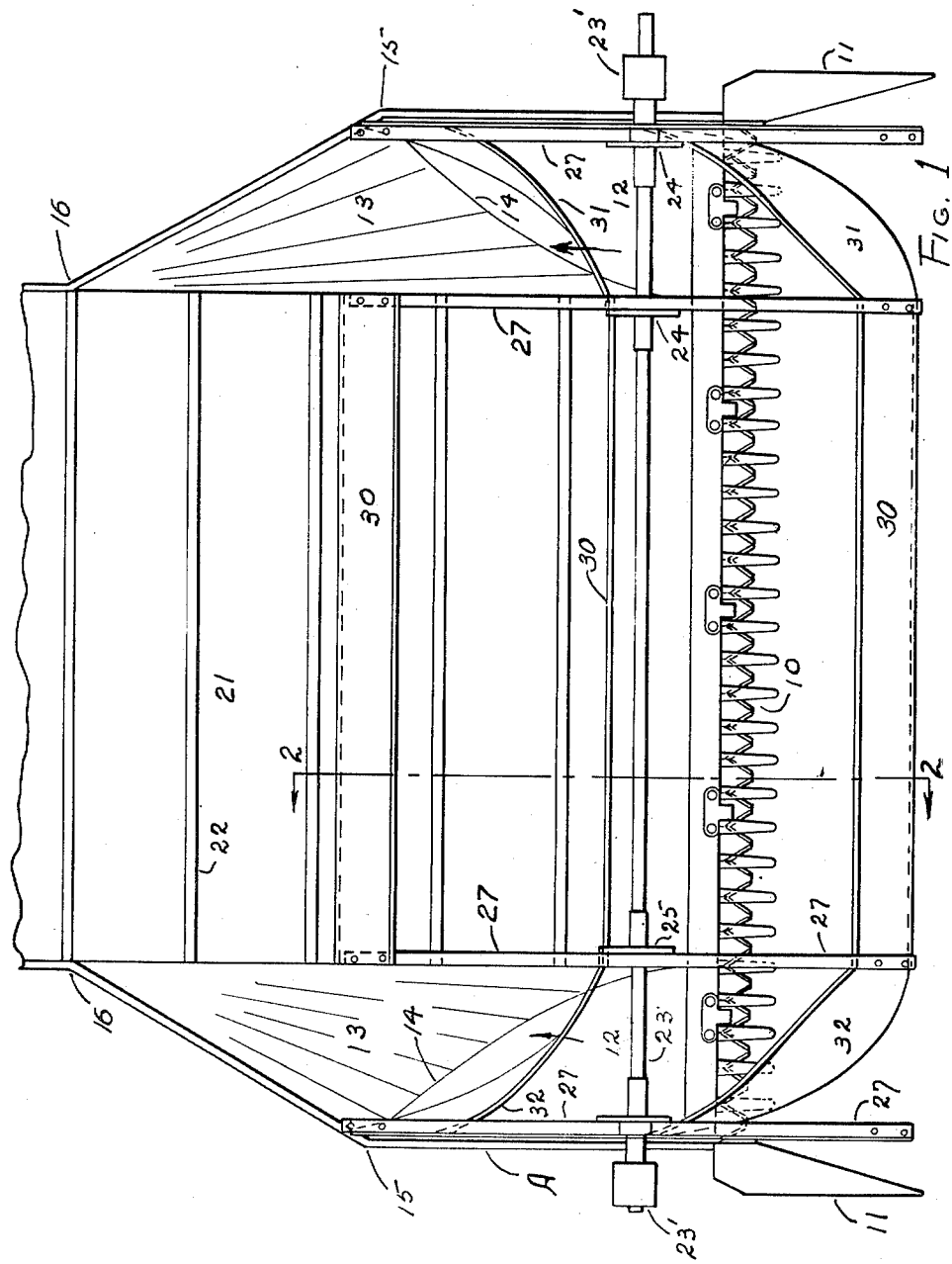
Figure 2:
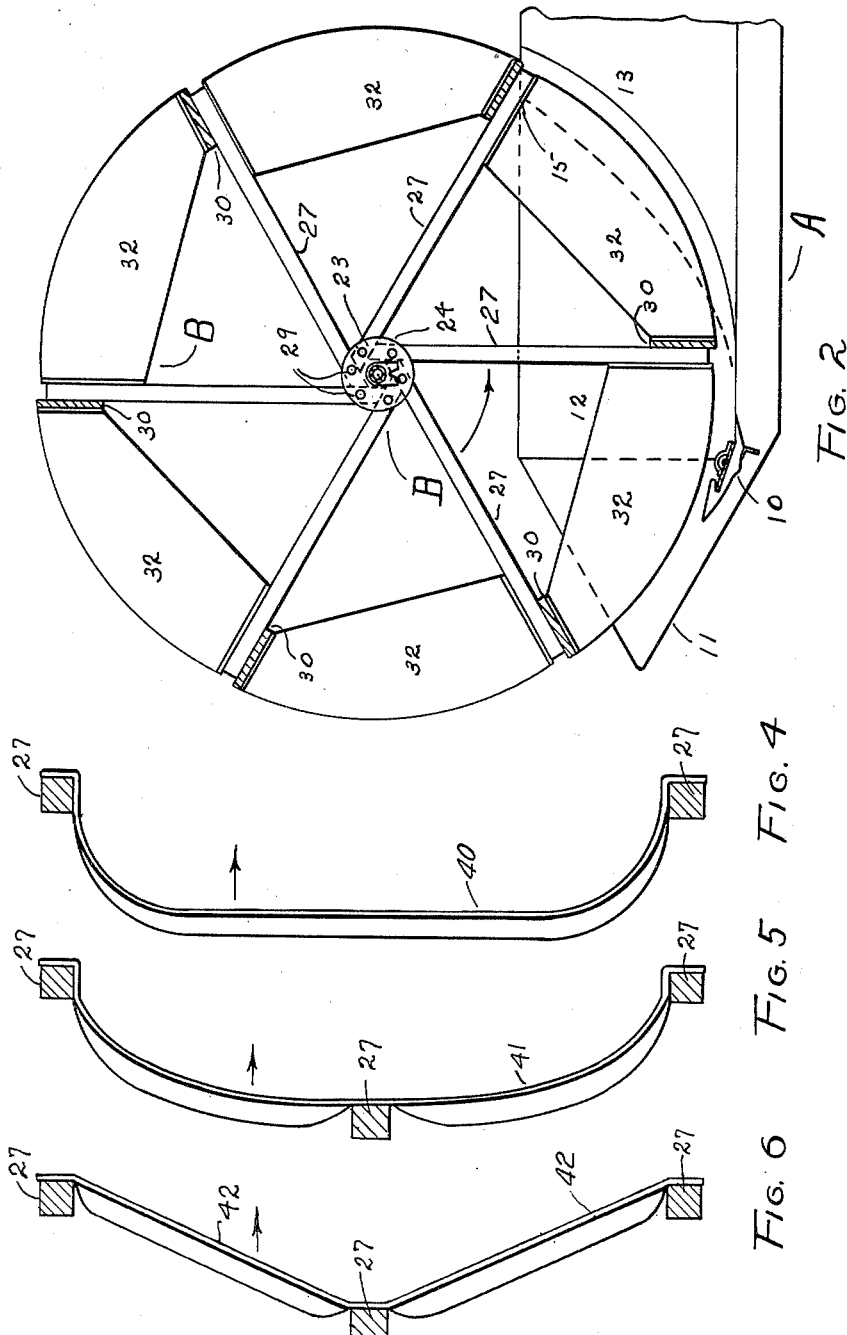
Fig. 2 is an end section of the reel taken on line 2—2 of Figure 1, showing a fraction of the platform, cutter bar, dividers and gathering guards.
Figure 3:
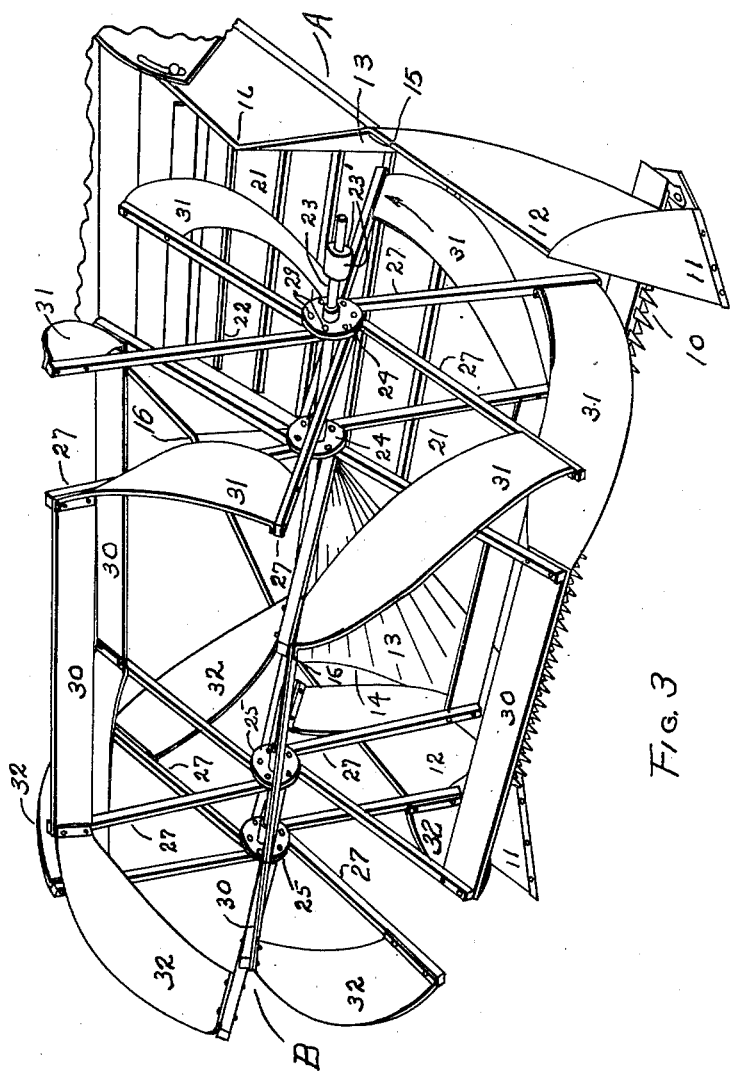
Fig. 3 is a three quarter front view of the device as shown in Figure 1.

In Figures 1, 2 and 3, A designates the platform in its entirety; and B designates the gathering reel in its entirety.

Figures 1, 2 and 3 illustrate the preferred form of my gathering reel, the design of which may also be used successfully when the cutter bar is no longer than the width of the elevator and cylinder.

Before the advent of the Troyer invention referred to, the length of the elevator and cylinder on all combines was substantially the same as the length of the cutter bar. This was a great disadvantage because the elevator and cylinder had nearly twice the operating capacity as the grain cut by the cutter bar. Furthermore a five foot cylinder was about as long as was practical. A seven or eight foot length cylinder was out of the question for structural and balancing features. Furthermore a five foot cutter bar presented too much of a limitation particularly for tractor operated combines. Therefore the Troyer design was an innovation of great value.

It seemed desirable to adhere to a five foot elevator and cylinder. Therefore the Troyer design was immediately accepted. However there developed limitations as to how much longer the cutter bar could be than the elevator and cylinder. Applicant has devised an improvement in reels which makes it possible to successfully operate for example, a combine with an eight foot cutter bar and a five foot elevator and cylinder.

In Figure 1, I illustrate substantially to scale a platform having an eight foot cutter bar and a five foot elevator serving a five foot cylinder.

In the figures the cutter bar is designated by reference numeral 10, the dividers are designated by reference numerals 11—11 and the gathering guards are designated by reference numerals 12—12 and 13—13. The rearwardly extending portions of the dividers 11 are parallel to each other and are vertical for a distance in order to clear the ends of the reel, the upper edges extending to points 15—15. From this point these members converge to points 16—16 from whence they are parallel to each other and extend rearwardly, terminating at the cylinder (not shown).

Gathering guard members 12 and 13 as shown are preferably somewhat similar to the design shown in the Troyer patent previously referred to. Members 13 are preferably curved inwardly and downwardly, terminating at the elevator and being secured to members 12 as at 14. Members 12 are for a distance in rear of the cutter bar, parallel to each other and vertical.

I have not shown the manner of mounting reel C on the platform and the mechanism used for raising and lowering the same. Such means are too well known to require description or illustration. In the drawings 21 designates the elevator which is preferably an endless canvas belt having spaced transverse slats 22.

My gathering reel B comprises a shaft 23 which is suitably rotatably mounted on bearings 23' which are vertically adjustably secured to the ends of the platform in any well known manner. The protruding end of the shaft has the usual driving means (not shown). On shaft 23 I secure pairs of flanged hubs 24 and 25, to the flanges of which I secure circumferentially spaced spokes 27 by means preferably of two bolts 29—29.

I provide preferably six spokes on each hub, the spokes of each pair and the pairs being in longitudinal alignment with the shaft. Between transversely aligned inner pairs of spokes 27, I secure reel bats 30 and between each outer spoke end and the inner spoke end in rear of the other spoke in direction of travel, I secure gathering members 31 and 32, which are preferably made from thin sheet metal. The twist and curve of these members make them very stiff and strong.

These members are each at their front ends, in direction of travel, preferably secured to the end of a spoke 27 and at their rear ends to the adjacent rear spoke 27 or to the bat 30. Members 32 are shaped about as shown and in a position to move the grain inwardly and rearwardly as the reel turns in the direction shown by arrows in the figures.

The forward ends of members 31 and 32 are connected to an outer spoke and their inner ends to an inner rearward spoke 27, or to the bat, thus forming pockets between which the grain is gathered and moved inwardly and rearwardly. It will be understood that members 31 and 32 may be secured either directly to the spoke or directly to a bat.

In operation because of members 31 and 32 the heads of the grain largely fall on the elevator. These members also act to move the grain rearwardly on members 12 and 13 and toward the elevator 21 so that when the grain is released by members 31 and 32 it is not only entangled with the grain on the elevator but is also on the curved gathering members 13 which also act to urge the grain toward and on the elevator, so that by the time the grain reaches the cylinder it is all well distributed on the elevator. Clearly therefore the grain will be fed into the cylinder in an evenly distributed mass, a condition which is ideal for threshing.

In Figures 4, 5 and 6 I illustrate modifications wherein end spokes are similar to that shown in Figures 1, 2 and 5. In Figure 4, bats 40 are preferably formed from flanged bar steel and are shaped and secured to end spokes as illustrated.

In Figure 5, I provide a center flanged hub 24 with spokes 27. Bats 41 are flattened at their centers and secured to the center spokes (as shown).

A still further modification is shown in Figure 6 having a center hub with spokes as in Figure 5, between end and center spokes I secure bats 42. In this design it will be seen that the tendency of the bats for the full length of the reel will be to urge the grain inwardly or toward the center of the elevator.

Either of the designs shown in Figures 4, 5 and 6 may be used with a platform having the same length cutter bar as the elevator or considerably wider than the elevator. However the preferred form of the reel is illustrated in Figures 1, 2 and 3. I do not wish to be limited to any particular form of bat, gathering means and position of reel spokes or gathering guards.

Having thus shown and described my invention I claim:

1. A harvester reel of the character described comprising, a rotatably mounted shaft, a number of circumferentially and longitudinally spaced pairs of spokes secured to the shaft, the spokes of alternate pairs being positioned near the ends of the shaft thus forming outer pairs of spokes, and the spokes of the other pairs being positioned a distance from the ends of the shaft thus forming inner pairs of spokes, and in transverse alignment with the adjacent pair of outer spokes, bats connecting the outer ends of the pairs of inner spokes, curved bats forming an operating connection between the outer ends of each end spoke and the next rearward in direction of travel inner spoke, whereby said curved bats will urge the grain contacted inwardly for contact with the bats connecting the inner pairs of spokes.

2. A device as recited in claim 1 including, a harvester platform on which said shaft is rotatably mounted having a cutter bar and an endless elevator, the elevator being concentric with the ends of the cutter bar and considerably narrower than the length of the cutter bar, gathering guards secured to the overhanging ends of the cutter bar and converging rearwardly and upwardly, the inner sides of said guards being parallel to and adjacent the sides of the elevator, the spacing of said inner pairs of spokes being substantially equal to the width of said elevator and the spacing of said outer pairs of spokes being substantially equal to the length of said cutter bar, whereby said guards and curved bats will cooperate to move the grain inwardly and upon the elevator.

CHARLES VERN EVERETT.

REFERENCES CITED

The following references are of record in the file of this patent:

UNITED STATES PATENTS

| Number | Name | Date |
| --- | --- | --- |
| Re. 21,421 | Troyer | Apr. 9, 1940 |
| 17,927 | Gumaer | Aug. 4, 1857 |
| 89,979 | Fisher et al. | May 11, 1869 |
| 473,072 | Knutson | Apr. 19, 1892 |
| 539,828 | Schneider | May 28, 1895 |
| 1,123,949 | Sturrock | Jan. 5, 1915 |
| 2,047,274 | Korsmo | July 14, 1936 |